United States Patent
Patnaikuni et al.

(10) Patent No.: US 12,340,150 B2
(45) Date of Patent: Jun. 24, 2025

(54) CONSTRUCTING VIRTUAL REALITY DESIGNED BUILDINGS

(71) Applicant: International Business Machines Corporation, Armonk, NY (US)

(72) Inventors: Subha Kiran Patnaikuni, Visakhapatnam (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 1007 days.

(21) Appl. No.: 17/341,719

(22) Filed: Jun. 8, 2021

(65) Prior Publication Data

US 2022/0391549 A1 Dec. 8, 2022

(51) Int. Cl.
| | |
|---|---|
| *G06F 30/12* | (2020.01) |
| *B29C 64/393* | (2017.01) |
| *B33Y 50/02* | (2015.01) |
| *B33Y 80/00* | (2015.01) |
| *G06F 30/13* | (2020.01) |
| *G06F 30/20* | (2020.01) |

(Continued)

(52) U.S. Cl.
CPC ............ *G06F 30/12* (2020.01); *B29C 64/393* (2017.08); *B33Y 50/02* (2014.12); *B33Y 80/00* (2014.12); *G06F 30/13* (2020.01); *G06F 30/20* (2020.01); *G06F 2111/16* (2020.01); *G06F 2111/18* (2020.01); *G06F 2113/10* (2020.01)

(58) Field of Classification Search
CPC .......... G06F 30/12; G06F 30/13; G06F 30/20; G06F 2111/16; G06F 2111/18; G06F 2113/10; B29C 64/393; B33Y 50/02; B33Y 80/00; B33Y 10/00
See application file for complete search history.

(56) References Cited

U.S. PATENT DOCUMENTS

| | | | |
|---|---|---|---|
| 10,255,729 | B1 | 4/2019 | Pulitzer |
| 10,911,885 | B1 * | 2/2021 | Chemistruck ........... H04S 7/303 |

(Continued)

FOREIGN PATENT DOCUMENTS

| | | |
|---|---|---|
| CN | 108573121 A | 9/2018 |
| CN | 106149863 B | 4/2019 |

(Continued)

OTHER PUBLICATIONS

Worawan Natephra et al., "Integrating building information modeling and virtual reality development engines for building indoor lighting design," Visualization in Engineering pp. 1-21 (Year: 2017).*

(Continued)

*Primary Examiner* — Chuen-Meei Gan
(74) *Attorney, Agent, or Firm* — Elliot J. Shine

(57) ABSTRACT

A processor may receive a building design of the building having one or more design components. A processor may receive, from at least one data collection device, a geographical location with one or more environmental parameters. A processor may simulate a virtual reality environment of the building design in the geographical location interacting with the one or more environmental parameters. A processor may augment the building design to an updated building design. The updated building design may be augmented based on the one or more environmental parameters.

20 Claims, 5 Drawing Sheets

(51) Int. Cl.
  *G06F 111/16* (2020.01)
  *G06F 111/18* (2020.01)
  *G06F 113/10* (2020.01)

(56) References Cited

U.S. PATENT DOCUMENTS

| | | | |
|---|---|---|---|
| 10,943,036 B2* | 3/2021 | Rezgui | G06F 30/347 |
| 2007/0013724 A1* | 1/2007 | Swift | G06F 30/00 |
| | | | 345/660 |
| 2013/0230832 A1 | 9/2013 | Peters | |
| 2014/0365182 A1* | 12/2014 | Marceau | G06F 30/13 |
| | | | 703/1 |
| 2015/0248504 A1* | 9/2015 | Glunz | B29C 64/393 |
| | | | 700/98 |
| 2019/0180509 A1* | 6/2019 | Laaksonen | G06F 3/04815 |
| 2021/0217245 A1* | 7/2021 | Akman | A63F 13/285 |

FOREIGN PATENT DOCUMENTS

| | | |
|---|---|---|
| KR | 100735676 B1 | 7/2007 |
| WO | 2019178983 A1 | 9/2019 |
| WO | 2022/257753 A1 | 12/2022 |

OTHER PUBLICATIONS

Bahrehmand, A., 2016. A Computational model for generating and analysing architectural layouts in virtual environments. (Year: 2016).*
International Searching Authority, "The International Search Report and The Written Opinion of the International Searching Authority", International application No. PCT/CN2022/094687, International filing date May 24, 2022, mailed mailing Aug. 24, 2022, 9 pages.
Yingchun et al., "The Application Of Virtual Reality Technology in Construction Engineering", The Science Education Article Collects, Feb. 2018, 3 pages, <http://www.cnki.net>. Abstract Translation Only.
Mell, et al., "The NIST Definition of Cloud Computing," Recommendations of the National Institute of Standards and Technology, U.S. Department of Commerce, Special Publication 800-145, Sep. 2011, 7 pgs.
Niemela, et al., "A virtual indoor environment model—a useful tool for design." Published in 2008. 4 pages. SJWEH Suppl. 2008;(4). pp. 39-42. https://www.sjweh.fi/show_abstract.php?abstract_id=1206.
Strother, N., "3D-Printed Homes Quietly Gain Traction." Published Nov. 20, 2019. 4 pages. Published by Forbes. https://www.forbes.com/sites/pikeresearch/2019/11/20/3d-printed-homes-quietly-gain-traction/?sh=1bbb8ef63bda.
Pu, Chunhua, "Application Analysis of VR Technology in Indoor Building Design" Northern Literature No. 24, China Academic Journal Electronic Publishing House, Aug. 25, 2018, 2 pages, <www.cnki.net>.

* cited by examiner

CONSTRUCTING VIRTUAL REALITY DESIGNED BUILDINGS

BACKGROUND

The present disclosure relates generally to the field of 3-Dimensional (3D) printing, and more particularly to methods and techniques for modifying building plans associated with 3D printing buildings.

3D printing technology has significantly altered how things are manufactured throughout various industries. Because of the versatility associated with 3D printing, efforts have been made to increase the spectrum of products that can be produced with these methods. As a result, 3D printing technology has not only been used to print components at the nanometer level, but also buildings and houses.

SUMMARY

Embodiments of the present disclosure include a method, computer program product, and system for designing a building. A processor may receive a building design of the building having one or more design components. A processor may receive, from at least one data collection device, a geographical location with one or more environmental parameters. A processor may simulate a virtual reality environment of the building design in the geographical location interacting with the one or more environmental parameters. A processor may augment the building design to an updated building design. The updated building design may be augmented based on the one or more environmental parameters.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
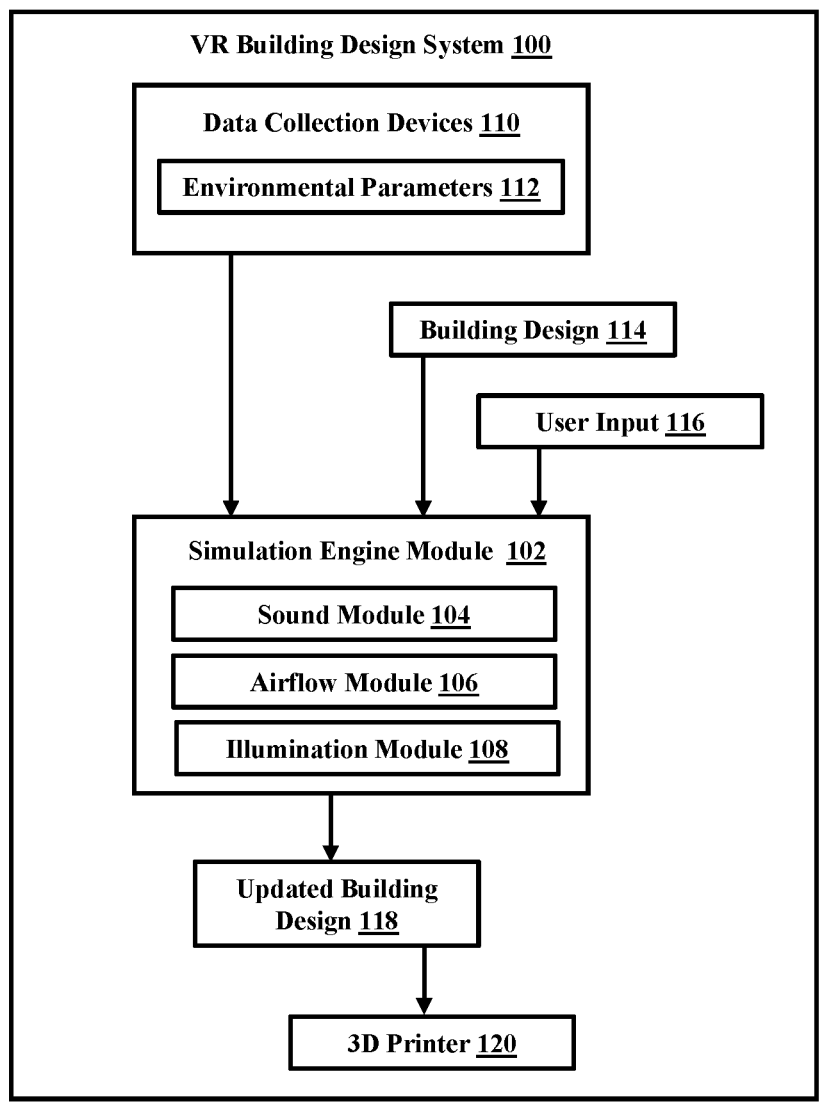
FIG. 1 illustrates a block diagram of a building design system, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The present disclosure relates generally to the field of 3-Dimensional (3D) printing, and more particularly to methods and techniques for modifying building plans associated with buildings (e.g., houses) to be 3D printed. While the present disclosure is not necessarily limited to such applications, various aspects of the disclosure may be appreciated through a discussion of various examples using this context.

People all over the world are looking at constructing a variety of different building structures, whether it is for housing their business or family. Due to the evolution of 3D technology over the years, 3D printing can be used to print/construct buildings. 3D printed buildings offer a variety of benefits including, but not limited to, lower constructions costs, reduced construction waste, reduced construction time, and an increase to the amount/variety of building shapes available to a person. Often, whether the building is constructed using 3D technology or traditional construction methods, the location of the building and surrounding environment can affect the building in unforeseen ways that decrease the person's satisfaction with the completed building.

For example, if a person were to build a house near a noisy highway, the person might try to anticipate the level of noise by requesting the building/house design include special noise reducing material (e.g., specialized soundproof windows). In this example, after construction has been completed and the person begins to occupy the house, they might realize that while the level of noise is reduced, the remaining noise from the highway is still undesirable to them. While in some instances a person might be able to upgrade a component of the house/building to further reduce the noise, such changes would likely not only be timely, but costly, and, in some situations, the level of noise, or undesirable aspect might not be able to be overcome with alterations to the current building design. In addition to the general structure and ascetic of the building in the particular location, a person is generally unable to understand how various environmental parameters (e.g., sound, movement of sounds, air flow, lighting, and temperature) might affect the habitability of the building and/or satisfaction of the person once construction is completed. As such, a method of determining how various environmental parameters might affect a constructed building, before construction is completed, is desirable. These methods would be particularly useful regarding 3D printed buildings, whose structure once completed would be difficult to alter or change.

In embodiments discussed herein, are solutions provided in the form of a method, system, and computer program product for designing a building using a virtual reality (VR) system. Embodiments contemplated herein enable a person or user to interact with and experience a VR environment (e.g., using a simulation engine module) of a particular building design that is virtually constructed in a particular geographical location. In embodiments, the VR system can be configured to include any number of equipment/components necessary to generate the simulated VR environment. This equipment/components may include, but are not limited to, sound generating components, airflow generating components, temperature generating components, and any other components necessary for generating/simulating the desired VR environment. While embodiments referenced herein may refer to a VR headset, any VR configuration (e.g., VR room) may also be used.

While reference is made generally throughout to a building design, the building design may refer to any building or structure a user may want to construct in a particular geographical location (e.g., an apartment in an apartment building, a house, factory, skyscraper, etc.). In some embodiments the building design of the building is a 3D model configured for VR, while in other embodiments the processor may convert a blueprint or 2D model of the building design to the necessary VR components and/or file types. A building design can include any design component or parameter that would be used to implement and construct the building design. These design components may include, but are not limited to, building configurations (e.g., fireplaces, openings, passages, arches, window size and/or placement), room dimensions and layouts, construction materials (e.g., soundproof windows, roof material), or any other component that could reside in the constructed building. In some embodiments design components may also include objects that a user might desire to position in a building (e.g., equipment, household appliances, furniture, etc.). In embodiments, a user can interact with the VR environment of the building design by virtually walking throughout the lay out of the building (e.g., walking from one room to the next).

A geographical location may refer to a general location (e.g., a city or county region) or a particular building site or land lot. Geographical locations can have one or more environmental parameters that may be specific to the particular geographical locations. Environmental parameters may include, but are not limited to, sound, weather patterns, amount of sunlight, surrounding topography, vegetation (e.g., trees), and surrounding visuals (e.g., scenic view). In addition, environmental parameters for a particular geographical location may change depending on the time of year or particular season. For example, a geographical location in New York will have different environmental parameters (e.g., freezing temps in winter) than the environmental parameters associated with a geographical location in Louisiana (e.g., high humidity in the summer).

In embodiments, a processor may collect one or more environmental parameters, associated with a particular geographical location from one or more data collection devices (e.g., data collection devices 110). Data collection devices may include, but are not limited to, IoT devices, one or more sensors, IoT (Internet of Things) devices, weather satellites, recording systems configured to capture environmental parameters associated with the geographical location, or any combination thereof. In some embodiments, any number of data collection devices may be positioned at a particular geographical location to collect the one or more different environmental parameters. In some embodiments, the data associated with the different environmental parameters can be stored in an historical repository and later accessed by the processor to generate the virtual reality environment and produce any additional simulations a user might request (e.g., what the lighting in a particular room might be at particular time and day).

Collecting one or more environmental parameters from the geographical location can provide a user with the ability to virtually experience how the environmental parameters affect different aspects of the building were the building design constructed in that particular geographical location. In embodiments, a processor could access the historical repository storing one or more environmental parameters and simulate one or more internal parameters of the building. An internal parameter may include the movement of sound (e.g., a room with an echo), airflow, temperature, and lighting/illumination or any other aspect that may be sensed or experienced by a user in a VR environment. More particularly, a processor may simulate how the physical obstacles (e.g., design components of the building design) represented within the VR environment of the building design affect the internal parameters experienced by the user.

In one example embodiment, where a particular geographical location is located near a busy railroad track the processor could collect one or more environmental parameters associated with sound caused by trains passing on the railroad track. In this example embodiment, a processor may generate the VR environment associated with a user's chosen building design and the geographical location, and allow the user to experience how the sound of the train (e.g., environmental parameter) is heard in different rooms of the building (e.g., internal parameters). In embodiments, a processor may extrapolate the various design components from the building design and determine how the environmental parameters are impacted by one or more design components. In embodiments, the processor may then identify one or more internal parameters (e.g., the simulated sound level inside the building) and simulate them in the VR environment for the user to experience. Continuing the above example, the sound of the train may be detected or sensed by the user virtually positioned within a particular room. It is commonly understood that design components associated with a particular room of the building can result in noise/sound being reduced/suppressed (e.g., having thick walls or soundwave reducing objects), while in other rooms, due to the differences in design components, the noise/sound may not be reduced/suppressed. In embodiments, a processor can simulate the differences in design components and generate a VR environment that provides a user the ability to experience how the internal parameters of the building change as the user virtually walks from room to room (or one portion to another portion) of the building. In some building designs, the internal parameters may change depending on where in the room the user is standing. For example, the user may experience airflow differently if they are standing by a window than they would if they were not in from of the window. The processor can continuously recalculate the internal parameters, using the collected environmental parameters, to provide the use with an accurate experience as they walk throughout the VR environment of the building.

In embodiments, a processor can receive instructions from a user to simulate one or more specific environmental parameters. A user may indicate to the processor via a user input to generate the VR environment with a particular weather condition (e.g., environmental parameter). In these embodiments, the environmental parameters associated with the particular weather condition and information may be collected from one or more data collection devices over time. For example, a user may instruct a computer system (e.g., a processor, processors, etc.) to simulate the building design at the geographical location during a rainstorm. In this example, the user could experience how the rain sounds hitting the roof of the building (e.g., sound of rain on a tin roof) and/or how airflow through the building changes as a result of the rainstorm. Similarly, a processor could receive instruction to generate a VR environment simulating the building and internal parameters during a particular weather season. For example, the user could instruct the processor to generate a VR environment simulating how the airflow of the building changes with a heavy snowfall during winter.

In embodiments, processor may augment the building design based, at least in part, on the user's interaction with the VR environment of the building design and generate an updated building design. In these embodiments, a processor may receive user input from a user interacting with the virtual reality environment. In some embodiments, user input may include the user wanting one or more internal parameters to be changed. Using the above example regarding loud trains passing by the geographical location, a user could provide user input indicating that, based on the VR environment, the noise/sound is too loud in one of the rooms. In some embodiments, user input could include a user's preference that the noise/sound in the particular room be below a particular decibel level. In these embodiments, a processor may generate and provide the user with one or more suggested alterations or changes to the design components of the building design. The processor may reconfigure the VR environment with one or more suggestions and simulate for the user how the internal parameters may be altered in response to the particular suggested alternations/changes.

For example, in response to the user specifying a particular internal parameter (e.g., specific decibel level of sound) the processor could recommend changing widows that reduce external sound (e.g., loud train noise) from entering the building and/or other noise dampening structural changes (e.g., thicker walls). In this example embodiment, in response to the user selecting one suggestion or both suggestions, the processor could generate an updated building design that includes the changes in the design components.

In embodiments, while the user is interacting with the VR environment, the processor can be configured to receive user input and simultaneously make changes/updates to the building design and VR environment. For example, a user may decide to increase a window's size or position to determine if the change in size or position affects the lighting (e.g., via sunlight) of the room. In this example, after the user instructs the processor of the change, the processor can change the VR environment and associated internal parameters to reflect the instruction and have a larger window size.

In addition, embodiments herein allow a person to experience looking out a window to see what of geographical location is visible from that viewpoint. For example, a user could determine if a scenic view is visible from a particular set of windows. In other embodiments, the user could determine, using one or more external parameters, if the view would be obstructed by trees after a particular duration of time. When the user is satisfied with the changes to the VR environment, they can update the building design to the updated building design and send the design to be constructed. In some embodiments, the updated design is sent to a 3D printer configured to print buildings. The 3D printer may then print or construct the updated design and produce the desired building the user interacted with in the VR environment.

Referring now to FIG. 1, a block diagram of a VR building design system 100, is depicted in accordance with embodiments of the present disclosure. FIG. 1 provides an illustration of only one implementation and does not imply any limitations with regard to the environments in which different embodiments may be implemented. Many modifications to the depicted environment may be made by those skilled in the art without departing from the scope of the invention as recited by the claims.

In embodiments, a VR building design system 100 may generate a VR environment of a building design in a particular geographical location for a user. In this VR environment, VR building design system 100 may allow the user to interact with the VR environment and experience the VR environment by virtually walking throughout the building. VR building design system 100 may use simulation engine module 102 to simulate/generate the VR environment. In embodiments, simulation engine module 102 may be configured to receive one or more datasets that may be necessary to generate the VR environment. These datasets may include, but are not limited to information/data associated with one or more data collection devices 110, building design 114, and user input 116.

In embodiments, VR building design system 100 may be configured to collect one or more environmental parameters 112 of a particular geographical location from one or more data collection devices 110. In embodiments, VR building design system 100 may configure a building design 114 of a building of interest to a user. Simulation engine module 100 may be configured to receive the one or more environmental parameters 112 and simulate how the internal parameters of the building design, were the building design to be implemented, would be affected by the one or more environmental parameters. Once generated, the user may interact with the VR environment.

In embodiments, simulation engine module 102 may include any software or hardware components that may be necessary to implement the VR environment. These components may include, but are not limited to, sound module 104, airflow module 106, and illumination module 108. In embodiments, sound module 104 may be configured to enable a user to experience how soundwaves interact with the particular building design. While in some embodiments, sound module 104 may be simulate sound associated with sound generated from an environmental parameter associated with the geographical location, in other embodiments, sound module 104 may simulate how sound generated in one room/portion of the building (e.g., building design 114) is heard in a different room/portion of the building. In embodiments, airflow module 104 may be configured to enable a user to experience airflow and possible changes in the airflow of the building design as the user virtually walks from one room/portion of the building to another. For example, an IoT device (e.g., data collection device 110) could capture the wind flow (e.g., environmental parameter) associated with the geographical location. In this example, simulation engine module 102 could simulate and generate for the user how the wind flow affects the airflow of the building design (e.g., internal parameter).

In embodiments, illumination module 104 may be configured to enable a user to experience the lighting of the building design. Lighting may include artificial light (e.g., floor lamps or ceiling lights) or natural light (e.g., sunlight). In embodiments, a VR environment may be generated to allow a user to experience how much sunlight particular rooms/portions of the building receives at a particular time during the day, during a particular season, or particular weather pattern (e.g., snowing).

In embodiments, VR building design system 100 may configure simulation engine module 102 to receive user input 116. Simulation engine module 102 may receive user input 116 and customizes the VR environment and/or building design. User input 116 may include, but is not limited to a user changing a particular environmental parameter 112 (e.g., the season associated with the current VR environment), a user requesting a particular internal parameter in a room/portion of the building, a user directly requesting one or more design components to be changed (e.g., changing window dimension, room size, opening side, etc.) inside the house will be changed, and the same will be shown in the simulated environment, or any combination thereof.

In embodiments, user input received by simulation engine module 102 may result in one or more changes to building design 114 (e.g., initial/original building design) and generate updated building design 118. In embodiments, simulation engine module 102 may also receive user input 116 indicating that the user is satisfied with the VR environment and updated building design 118. Simulation engine module 102 may then finalize updated building design 118. In embodiments, simulation engine module 102 may be configured to send the finalized updated building design to one or more 3D printers 120. The one or more 3D printers may then be configured to print/build/construct the building associated with the updated building design 118 in the particular geographical location.

Figure 2:
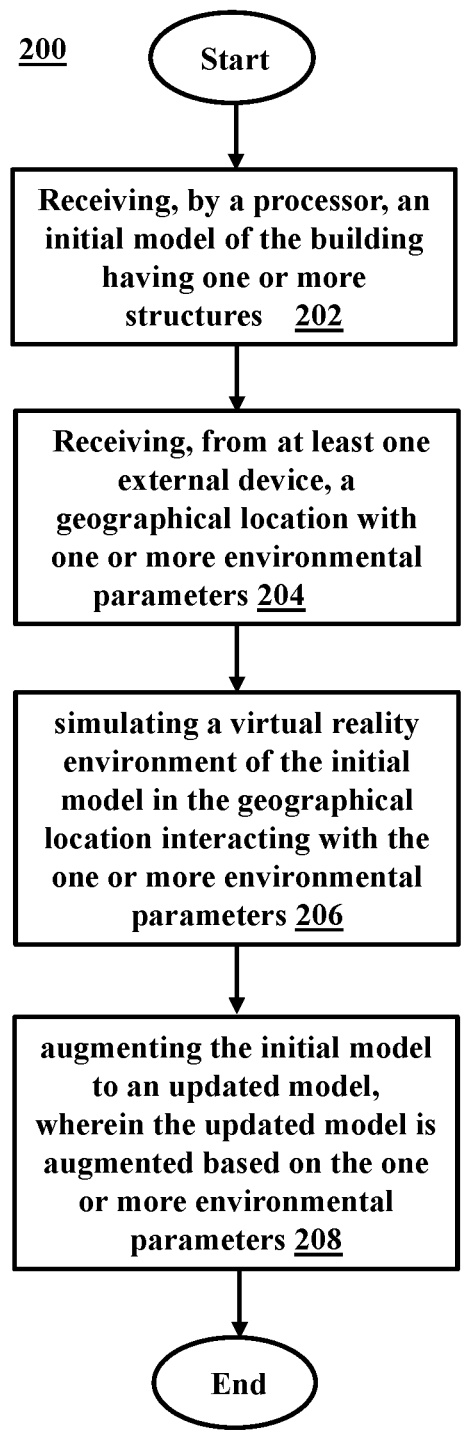
FIG. 2 illustrates a flowchart of a method for designing a building in a virtual reality environment, in accordance with embodiments of the present disclosure.

Referring now to FIG. 2, a flowchart illustrating an example method 200 for designing a building in a virtual reality environment, in accordance with embodiments of the present disclosure. In some embodiments, the method 200 begins at operation 202 where a processor a building design of the building having one or more design components.

In some embodiments, the method 200 proceeds to operation 204. At operation 204, a processor may receive one or more environmental parameters, associated with a geographical location, from at least one data collection device. In some embodiments, the method 200 proceeds to operation 206. At operation 206, the processor simulates a virtual reality environment of the building design in the geographical location interacting with the one or more environmental parameters.

In some embodiments, the method 200 proceeds to operation 208. At operation 208, the processor augments the building design to an updated building design. In embodiment, the updated building design may be augmented based on the one or more environmental parameter and one or more design components. In some embodiments, as depicted in FIG. 2, after operation 208, the method 200 may end.

As discussed in more detail herein, it is contemplated that some or all of the operations of the method 200 may be performed in alternative orders or may not be performed at all; furthermore, multiple operations may occur at the same time or as an internal part of a larger process.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
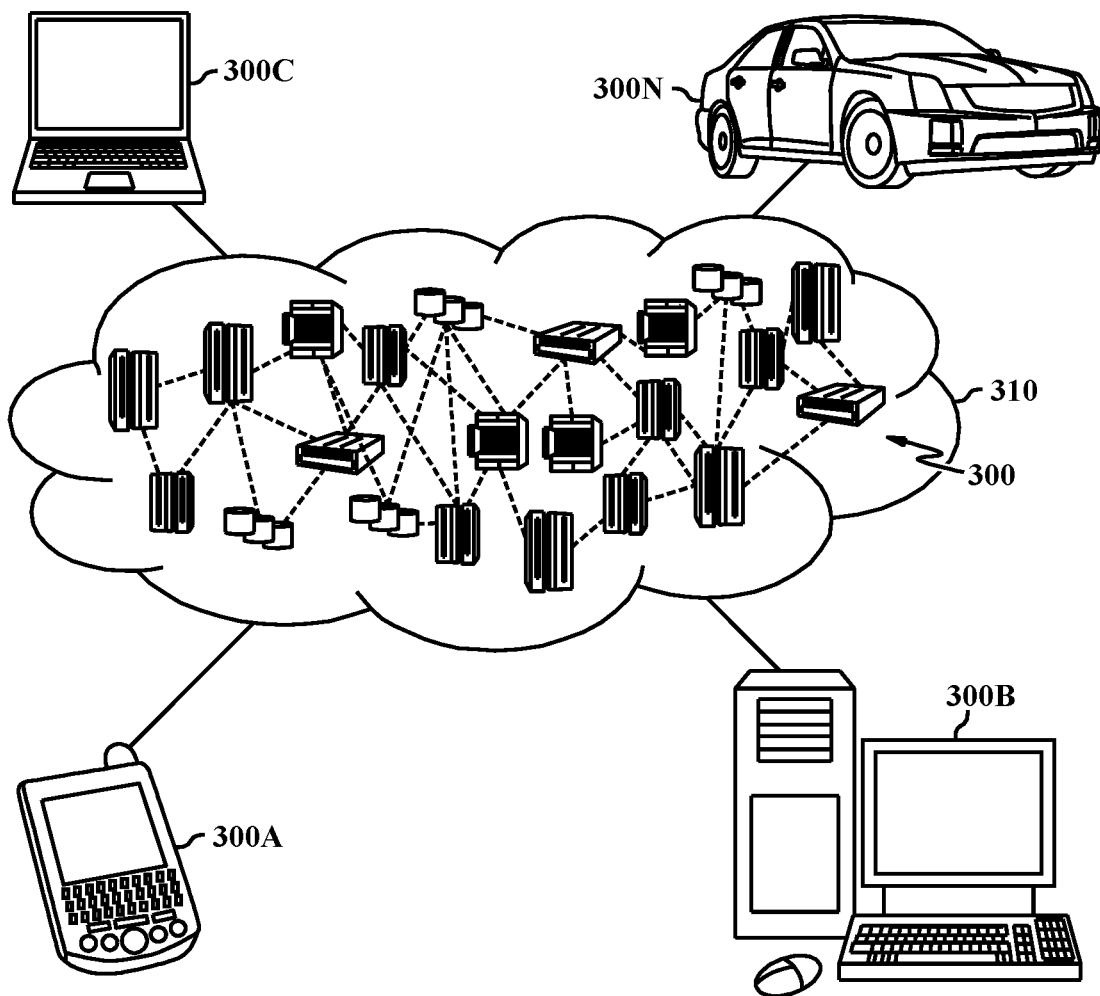
FIG. 3A illustrates a cloud computing environment, in accordance with embodiments of the present disclosure.

Referring now to FIG. 3A, illustrative cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof. This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing 300 and cloud computing environment 310 can communicate with any type of computerized device over any type of network and/or network addressable connection (e.g., using a web browser).

Figure 3B:
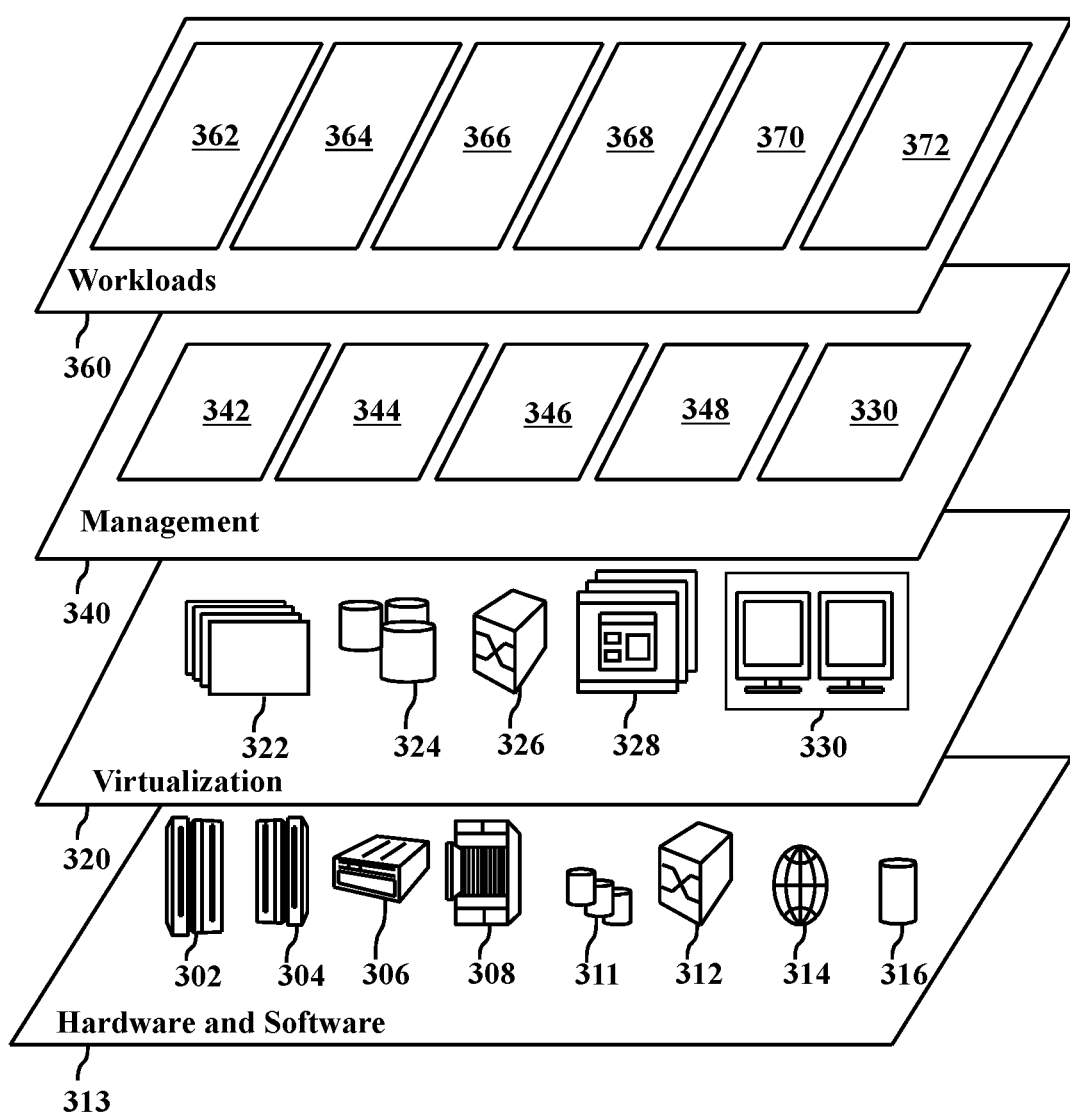
FIG. 3B illustrates abstraction model layers, in accordance with embodiments of the present disclosure.

Referring now to FIG. 3B, a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and proactive building managing 372.

Figure 4:
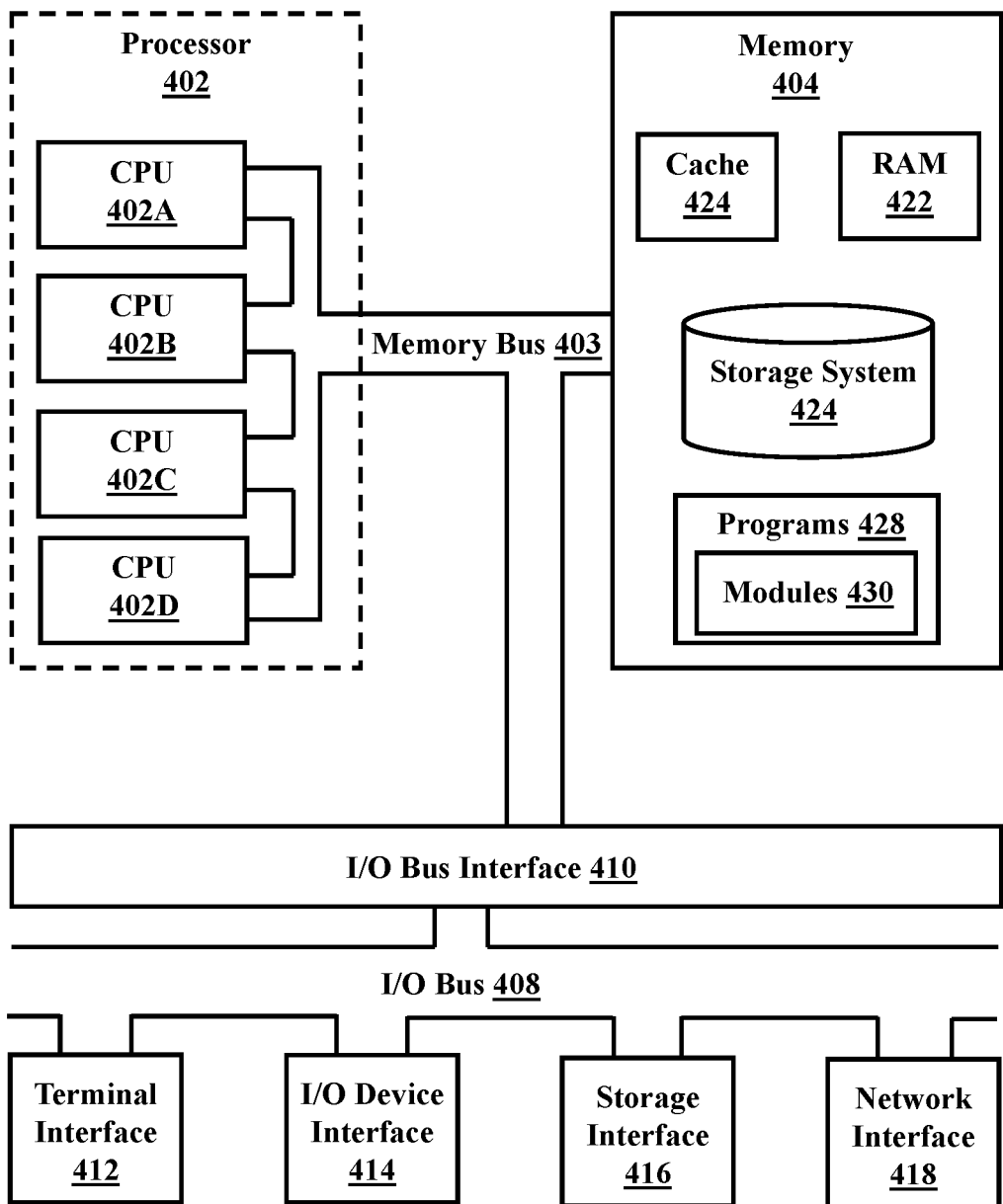
FIG. 4 illustrates a high-level block diagram of an example computer system that may be used in implementing one or more of the methods, tools, and modules, and any related functions, described herein, in accordance with embodiments of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present invention. In some embodiments, the major components of the computer system 401 may comprise one or more Processor 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method of designing a building in a virtual reality environment, the method comprising:
    receiving, by a processor, a building design of the building having design components;
    receiving, from at least one data collection device, one or more environmental parameters associated with a geographical location;
    simulating a virtual reality environment of the building design in the geographical location interacting with the one or more environmental parameters including a sound according to a user's location within the virtual reality environment;
    augmenting the building design to an updated building design, wherein the updated building design is augmented based on the one or more environmental parameters, wherein the one or more environmental parameters are updated in response to user input received in the virtual reality environment including a decibel level for the sound, wherein the updated building design includes one or more updated design components selected by the user from a plurality of recommendations presented within the virtual reality environment; and
    printing a building using one or more 3D printers based on the updated building design.

2. The method of claim 1, wherein the geographical location interacting with the one or more environmental parameters further includes:
    determining one or more internal parameters of the building based on the interaction of the building design and the one or more environmental parameters; and
    simulating the one or more internal parameters in the virtual reality environment.

3. The method of claim 1, wherein responsive to receiving the user input from the user interacting with the virtual reality environment further includes:
    altering the one or more design components of the building design;
    updating, responsive to altering the one or more design components, the simulation of the virtual reality environment and the interaction of the updated building design and the one or more environmental parameters.

4. The method of claim 1, wherein the user input from the user interacting with the virtual reality environment is a desired internal parameter input.

5. The method of claim 4, wherein responsive to receiving a desired environmental input from the user includes:
    one or more design components of the building design, wherein altering the one or more design components changes the virtual reality environment.

6. The method of claim 1, wherein the simulating of the virtual reality environment further comprises:
    simulating an airflow and changes within the airflow according to a user's location within the virtual reality environment of the building design.

7. The method of claim 1, wherein the simulating of the virtual reality environment further comprises:
    simulating lighting according to a user's location within the virtual reality environment of the building design, wherein the lighting includes at least artificial light and natural light.

8. The method of claim 7, wherein the user input received in the virtual reality environment for simulating the lighting includes at least, one or more of, a particular time of day, a season, or a weather pattern.

9. A system for designing a building in a virtual reality environment, the system comprising:
    a memory; and
    a processor in communication with the memory, the processor being configured to perform operations comprising:
    receiving a building design of the building having design components;
    receiving, from at least one data collection device, one or more environmental parameters associated with a geographical location;
    simulating a virtual reality environment of the building design in the geographical location interacting with the one or more environmental parameters including a sound according to a user's location within the virtual reality environment;

augmenting the building design to an updated building design, wherein the updated building design is augmented based on the one or more environmental parameters, wherein the one or more environmental parameters are updated in response to user input received in the virtual reality environment including a decibel level for the sound, wherein the updated building design includes one or more updated design components selected by the user from a plurality of recommendations presented within the virtual reality environment; and printing a building using one or more 3D printers based on the updated building design.

10. The system of claim 9, wherein the geographical location interacting with the one or more environmental parameters further includes:

determining one or more internal parameters of the building based on the interaction of the building design and the one or more environmental parameters; and simulating the one or more internal parameters in the virtual reality environment.

11. The system of claim 9, wherein responsive to receiving the user input from the user interacting with the virtual reality environment further includes:

altering the one or more design components of the building design;

updating, responsive to altering the one or more design components, the simulation of the virtual reality environment and the interaction of the updated building design and the one or more environmental parameters.

12. The system of claim 9, wherein the user input from the user interacting with the virtual reality environment is a desired internal parameter input.

13. The system of claim 12, wherein responsive to receiving a desired environmental input from the user includes:

one or more design components of the building design, wherein altering the one or more design components changes the virtual reality environment.

14. The system of claim 9, wherein the simulating of the virtual reality environment further comprises:

simulating an airflow and changes within the airflow according to a user's location within the virtual reality environment of the building design.

15. The system of claim 9, wherein the simulating of the virtual reality environment further comprises:

simulating lighting according to a user's location within the virtual reality environment of the building design, wherein the lighting includes at least artificial light and natural light.

16. A computer program product for designing a building in a virtual reality environment, comprising:

one or more computer readable storage media, and program instructions collectively stored on the one or more computer readable storage media, the program instructions comprising:

receiving a building design of the building having design components;

receiving, from at least one data collection device, one or more environmental parameters associated with a geographical location;

simulating a virtual reality environment of the building design in the geographical location interacting with the one or more environmental parameters including a sound according to a user's location within the virtual reality environment;

augmenting the building design to an updated building design, wherein the updated building design is augmented based on the one or more environmental parameters, wherein the one or more environmental parameters are updated in response to user input received in the virtual reality environment including a decibel level for the sound, wherein the updated building design includes one or more updated design components selected by the user from a plurality of recommendations presented within the virtual reality environment; and printing a building using one or more 3D printers based on the updated building design.

17. The computer program product of claim 16, wherein the geographical location interacting with the one or more environmental parameters further includes:

determining one or more internal parameters of the building based on the interaction of the building design and the one or more environmental parameters; and simulating the one or more internal parameters in the virtual reality environment.

18. The computer program product of claim 16, wherein responsive to receiving the user input from the user interacting with the virtual reality environment further includes:

altering the one or more design components of the building design;

updating, responsive to altering the one or more design components, the simulation of the virtual reality environment and the interaction of the updated building design and the one or more environmental parameters.

19. The computer program product of claim 16, wherein the user input from the user interacting with the virtual reality environment is a desired internal parameter input.

20. The computer program product of claim 16, wherein the simulating of the virtual reality environment further comprises:

simulating an airflow and changes within the airflow according to a user's location within the virtual reality environment of the building design.

* * * * *